(12) United States Patent
Egashira et al.

(10) Patent No.: US 10,330,194 B2
(45) Date of Patent: Jun. 25, 2019

(54) CONTROL APPARATUS

(71) Applicant: HONDA MOTOR CO., LTD., Tokyo (JP)

(72) Inventors: Fumio Egashira, Wako (JP); Yasuyuki Hibino, Wako (JP); Yutaka Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/857,003

(22) Filed: Dec. 28, 2017

(65) Prior Publication Data
US 2018/0202546 A1  Jul. 19, 2018

(30) Foreign Application Priority Data

Jan. 13, 2017 (JP) .................... 2017-004575

(51) Int. Cl.
*F16H 61/14* (2006.01)
*F16D 48/06* (2006.01)
*F16H 59/54* (2006.01)

(52) U.S. Cl.
CPC ........... *F16H 61/143* (2013.01); *F16D 48/06* (2013.01); *F16H 59/54* (2013.01); *F16D 2500/1045* (2013.01); *F16D 2500/10412* (2013.01); *F16D 2500/3063* (2013.01); *F16D 2500/30807* (2013.01); *F16D 2500/30816* (2013.01);
(Continued)

(58) Field of Classification Search
CPC ........ F16H 61/14; F16H 61/143; F16H 59/54; F16H 2312/18; F16D 48/06
See application file for complete search history.

(56) References Cited

U.S. PATENT DOCUMENTS

| 6,183,391 B1 * | 2/2001 | Iijima | ..................... F16H 61/14 |
| | | | 477/62 |
| 6,334,835 B1 * | 1/2002 | Tanaka | .................. F02D 41/126 |
| | | | 477/187 |

(Continued)

FOREIGN PATENT DOCUMENTS

| JP | 2001-330140 A | 11/2001 |
| JP | 2010-127398 A | 6/2010 |
| JP | 2010-281347 A | 12/2010 |

OTHER PUBLICATIONS

Office Action dated Aug. 3, 2018, in Japanese Patent Application No. 2017-004575.

*Primary Examiner* — Edwin A Young
(74) *Attorney, Agent, or Firm* — Thomas | Horstemeyer, LLP

(57) ABSTRACT

A control apparatus for an automatic transmission including a torque converter with a lock-up clutch capable of connecting the output shaft of an engine and the input shaft of the automatic transmission includes a state determination unit configured to determine, based on an operation signal from an ABS device, whether the ABS device of a vehicle is in a normally operating state or in a fail state, a rotation speed determination unit configured to determine whether the rotation speed of the input shaft is not less than a reference rotation speed, and an operation control unit configured to control engagement of the lock-up clutch based on the operation state of the ABS device and the result of comparison between the rotation speed of the input shaft and the reference rotation speed.

4 Claims, 10 Drawing Sheets

(52) U.S. Cl.
CPC ........... *F16D 2500/3109* (2013.01); *F16D 2500/3165* (2013.01); *F16H 2312/18* (2013.01)

(56) References Cited

U.S. PATENT DOCUMENTS

| | | | |
|---|---|---|---|
| 6,656,084 B2 | 12/2003 | Inoue et al. | |
| 7,074,160 B1* | 7/2006 | Inoue | B60K 28/165 |
| | | | 477/180 |
| 8,272,486 B2 | 9/2012 | Takei et al. | |
| 2008/0026905 A1* | 1/2008 | Dickinson | B60W 10/026 |
| | | | 477/62 |

* cited by examiner

FIG. 2A

|  | C1 | C2 | C3 | B1 | B2 | B3 | F1 | GEAR RATIO |
|---|---|---|---|---|---|---|---|---|
| RVS |  |  | ○ |  | ○ |  | ○ | 4.008 |
| 1st |  |  |  | ○ | ○ | (○) | △/○ | 5.233 |
| 2nd |  | ○ |  | ○ | ○ |  | (△) | 3.367 |
| 3rd |  |  | ○ | ○ | ○ |  | (△) | 2.298 |
| 4th |  | ○ | ○ | ○ |  |  | (△) | 1.705 |
| 5th | ○ |  | ○ | ○ |  |  | (△) | 1.363 |
| 6th | ○ | ○ | ○ |  |  |  | (△) | 1.000 |
| 7th | ○ |  | ○ |  | ○ |  | (△) | 0.786 |
| 8th | ○ | ○ |  |  | ○ |  | (△) | 0.657 |
| 9th | ○ |  |  |  | ○ | ○ | (△) | 0.584 |
| 10th | ○ | ○ |  |  |  | ○ | (△) | 0.520 |
| P/N |  |  |  |  |  |  | △/○ | — |
| RPM | ○ |  | ○ |  |  | ○ | △→○ | — |

FIG. 2B

| PLANETARY GEAR MECHANISM | GEAR RATIO |
|---|---|
| P1 | 2.681 |
| P2 | 1.914 |
| P3 | 1.614 |
| P4 | 2.734 |

FIG. 5

| STEP | ENGAGING OPERATION | | | | | | | SHIFT CONDITION |
|---|---|---|---|---|---|---|---|---|
| | B3 | B2 | B1 | C3 | C2 | C1 | F1 | |
| 1 | – | ↓ | ↓ | – | – | – | △ | COMPLETION OF RELEASE |
| 2 | ○ | – | – | ○ | – | ○ | △ | INPUT ROTATION SPEED ≒ 0 COMPLETION OF ENGAGEMENT OF C1 ETC. |
| 3 | ○ | – | – | ○ | – | ○ | ○ | COMPLETION OF SWITCHING OF F1 |
| 4 | ↓ | ○ | – | ○ | – | ↓ | ○ | |

↓ : RELEASING
○ : ENGAGE
– : RELEASE
F1/△ : ONE-WAY ROTATION PERMISSION
F1/○ : ROTATION INHIBITION

FIG. 8

| GEAR RANGE | ROTATION SPEED |
|---|---|
| 2 | N2 |
| 3 | N3 |
| 4 | N4 |
| 5 | N5 |
| 6 | N6 |
| 7 | N7 |
| 8 | N8 |
| 9 | N9 |
| 10 | N10 |

121

CONTROL APPARATUS

CROSS-REFERENCE TO RELATED APPLICATION

This application claims the benefit of Japanese Patent Application No. 2017-004575 filed Jan. 13, 2017, which is hereby incorporated by reference herein in its entirety.

BACKGROUND OF THE INVENTION

Field of the Invention

The present invention relates to a control apparatus for an automatic transmission.

Description of the Related Art

Japanese Patent Laid-Open No. 2001-330140 discloses, as a control apparatus for a vehicle clutch, an arrangement that controls a lock-up clutch based on the input shaft rotation speed (engine speed) and the output shaft rotation speed (the input shaft rotation speed of an automatic transmission) of the lock-up clutch.

In a case in which the running state of a vehicle is a deceleration state, the condition to engage the lock-up clutch is that fuel cut is being performed. However, if the rotation speed of each gear range lowers along with an increase in the number of gear ranges of the automatic transmission, it may be impossible to continue the fuel cut in many ranges. Accordingly, if the number of ranges where the lock-up clutch is disengaged increases, improvement of fuel consumption may be limited.

The present invention provides a control apparatus for an automatic transmission, which can control the engagement of a lock-up clutch based on the operation state of an ABS device and the result of comparison between the rotation speed of an input shaft and a reference rotation speed even in a range where fuel cut is not performed in a case in which the running state of the vehicle is a deceleration state.

SUMMARY OF THE INVENTION

According to one aspect of the present invention, there is provided a control apparatus for an automatic transmission including a torque converter with a lock-up clutch capable of connecting an output shaft of an engine and an input shaft of the automatic transmission, comprising: a fuel cut determination unit configured to determine, based on a control signal to control the engine, whether fuel cut to cut off fuel supply to the engine is being executed in a case in which a running state of a vehicle is a deceleration state based on detection by a detection unit configured to detect the running state of the vehicle; a state determination unit configured to determine, based on an operation signal from an ABS device, whether the ABS device of the vehicle is in a normally operating state or in a fail state in which the ABS device does not normally operate; a rotation speed determination unit configured to determine whether a rotation speed of the input shaft detected by a rotation speed detection unit is not less than a reference rotation speed corresponding to a gear range of the automatic transmission; and an operation control unit configured to control engagement of the lock-up clutch based on an operation state of the ABS device and a result of comparison between the rotation speed of the input shaft and the reference rotation speed in a state in which the running state of the vehicle is the deceleration state, and the fuel cut is not being executed.

According to the present invention, it is possible to control the engagement of a lock-up clutch based on the operation state of an ABS device and the result of comparison between the rotation speed of an input shaft and a reference rotation speed even in a range where fuel cut is not performed in a case in which the running state of the vehicle is a deceleration state.

Further features of the present invention will become apparent from the following description of exemplary embodiments (with reference to the attached drawings).

BRIEF DESCRIPTION OF THE DRAWINGS

FIG. 2A is a view showing an example of the engagement table of engaging mechanisms;

FIG. 2B is a view showing the gear ratios of planetary gear mechanisms;

FIG. 5 is a view for explaining the outline of processing performed when the reverse range is selected;

FIG. 8 is a view showing a control map.

DESCRIPTION OF THE EMBODIMENTS

Figure 1:
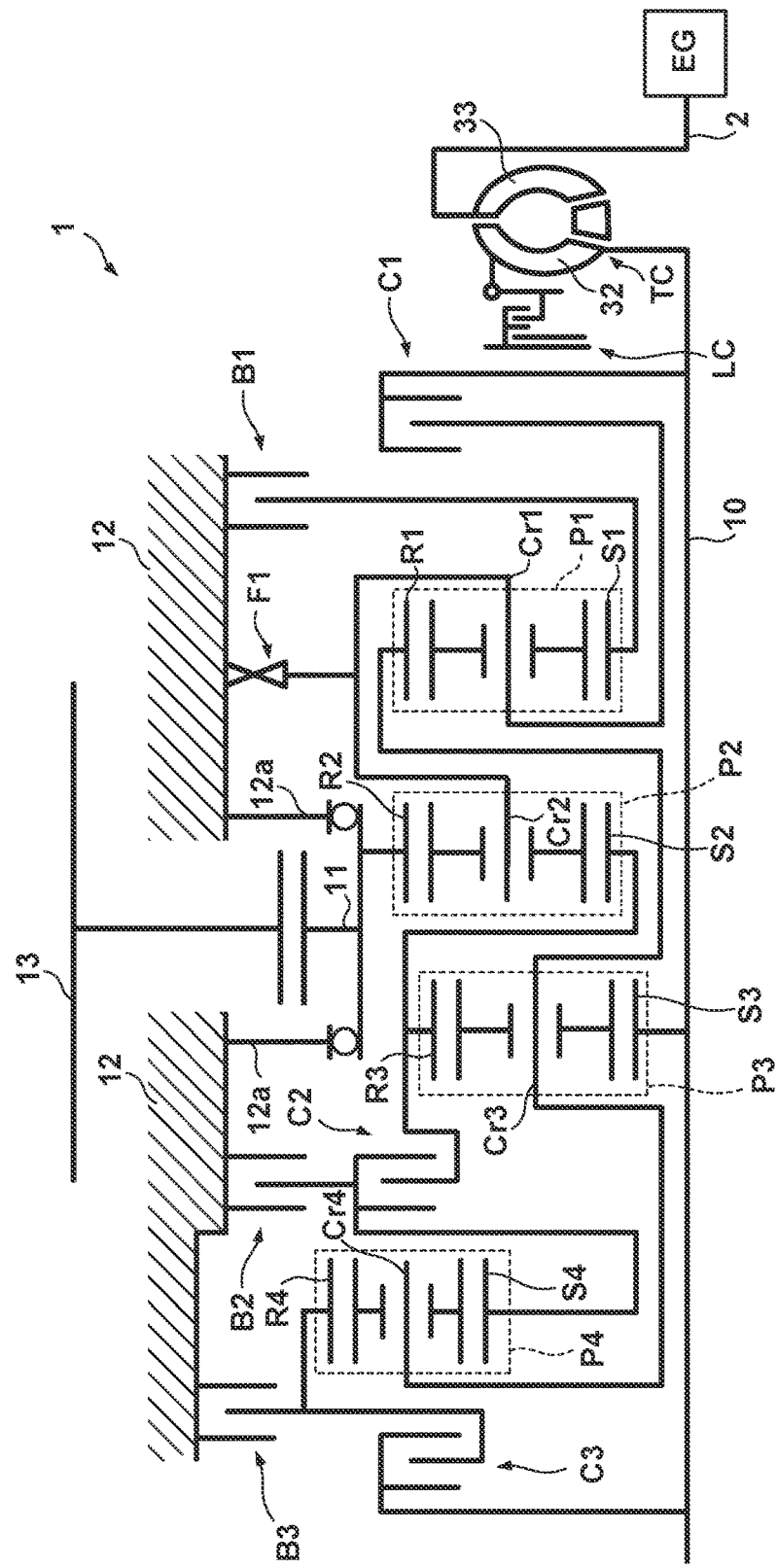
FIG. 1 is a skeleton diagram of an automatic transmission according to an embodiment of the present invention.

FIG. 1 is a skeleton diagram of an automatic transmission 1 according to an embodiment of the present invention. Referring to FIG. 1, the automatic transmission 1 includes an input shaft 10 rotatably axially supported in a casing 12 that forms a transmission case, an output member 11 rotatably supported by support members 12a supported in the casing 12 so as to be coaxial with respect to the input shaft 10, and an output shaft (counter shaft) 13.

A driving force from an internal combustion engine EG (to be sometimes simply referred to as EG) is input to the input shaft 10, and the input shaft 10 is rotated by the driving force. A starting device is provided between the input shaft 10 and the internal combustion engine EG. Examples of the starting device are a clutch type starting device (single disc clutch, multiple disc clutch, or the like) and a hydraulic coupling type starting device (torque converter or the like). In this embodiment, a torque converter TC is provided. Hence, the driving force of the internal combustion engine EG is input to the input shaft 10 via the torque converter TC.

The output member 11 includes a gear concentric to the input shaft 10. The output shaft 13 includes a gear that meshes with the gear. The rotation of the input shaft 10 changes its speed via transmission mechanisms to be described below and is then transmitted to the output shaft 13. The rotation (driving force) of the output shaft 13 is transmitted to driving wheels via, for example, differential gears (not shown).

As the transmission mechanisms, the automatic transmission 1 includes planetary gear mechanisms P1 to P4 and engaging mechanisms C1 to C3, B1 to B3, and F1. In this embodiment, all the planetary gear mechanisms P1 to P4 are single pinion type planetary gear mechanisms. The planetary gear mechanisms P1 to P4 transmit the driving force from the input shaft 10 to the output member 11. The planetary gear mechanisms P1 to P4 can form a plurality of driving force transmission paths. The engaging mechanisms C1 to C3, B1 to B3, and F1 switch the driving force transmission paths of the planetary gear mechanisms P1 to P4, thereby establishing a plurality of gear ranges.

The planetary gear mechanisms P1 to P4 include sun gears S1 to S4, ring gears R1 to R4, and carriers Cr1 to Cr4 each supporting a pinion gear, respectively, as rotational elements (12 in total), and are disposed to be coaxial with respect to the input shaft 10.

When ordered in accordance with the arrangement order at intervals corresponding to gear ratios shown in the velocity diagram of FIG. 3 (to be described later), the sun gear S1, the carrier Cr1, and the ring gear R1 of the planetary gear mechanism P1 can be referred to as a first rotational element, a second rotational element, and a third rotational element in this order.

Similarly, the ring gear R2, the carrier Cr2, and the sun gear S2 of the planetary gear mechanism P2 can be referred to as a fourth rotational element, a fifth rotational element, and a sixth rotational element in this order.

Similarly, the sun gear S3, the carrier Cr3, and the ring gear R3 of the planetary gear mechanism P3 can be referred to as a seventh rotational element, an eighth rotational element, and a ninth rotational element in this order. Similarly, the ring gear R4, the carrier Cr4, and the sun gear S4 of the planetary gear mechanism P4 can be referred to as a 10th rotational element, a 11th rotational element, and a 12th rotational element in this order.

Each of the engaging mechanisms C1 to C3, B1 to B3, and F1 functions as a clutch or a brake. A clutch connects/disconnects the rotational elements provided in the automatic transmission 1. A brake connects/disconnects the rotational elements provided in the automatic transmission 1 to/from the casing 12. The rotational elements provided in the automatic transmission 1 include the input shaft 10 and the sun gears, ring gears, and carriers of the planetary gear mechanisms P1 to P4.

In this embodiment, the engaging mechanisms C1 to C3 are clutches, and the engaging mechanisms B1 to B3 and F1 are brakes. Hence, the engaging mechanisms C1 to C3 are sometimes called the clutches C1 to C3, and the engaging mechanisms B1 to B3 and F1 are sometimes called the brakes B1 to B3 and F1. When the engaging mechanisms C1 to C3 and B1 to B3 are switched between an engaging state (fastening state) and a release state, and the state of the engaging mechanism F1 is switched, the driving force transmission path from the input shaft 10 to the output member 11 is switched, and the plurality of gear ranges are implemented.

In this embodiment, all the engaging mechanisms C1 to C3 and B1 to B3 are assumed to be hydraulic friction engaging mechanisms. Examples of the hydraulic friction engaging mechanism are dry and wet single disc clutches and dry and wet multiple disc clutches.

The engaging mechanism F1 is provided between the casing 12 and predetermined rotational elements (here, the carriers Cr1 and Cr2 connected to each other). The engaging mechanism F1 can be switched between a one-way rotation permission state (to be sometimes referred to as OWC) in which the rotation of the predetermined rotational elements (carriers Cr1 and Cr2) is restricted only in one direction, and rotation in the reverse direction is permitted and a rotation inhibition state (to be sometimes referred to as TWC) in which rotation is restricted in both directions.

In the one-way rotation permission state, the same function as a so-called one-way clutch is implemented. In this state, the rotational elements transmit the driving force in one rotation direction but slip in the reverse direction. In this embodiment, the engaging mechanism F1 functions as a brake. For this reason, if the engaging mechanism F1 is in the one-way rotation permission state, the predetermined rotational elements (carriers Cr1 and Cr2) are permitted to rotate only in one direction. In the rotation inhibition state, the rotational elements transmit the driving force in both rotation directions. In this embodiment, the engaging mechanism F1 functions as a brake. For this reason, if the engaging mechanism F1 is in the rotation inhibition state, the predetermined rotational elements (carriers Cr1 and Cr2) are inhibited from rotating in both directions.

An example of the structure of the engaging mechanism F1 will be described later. For example, a known two-way clutch can be employed. Some known two-way clutches can be switched between the one-way rotation permission state, the rotation inhibition state, and a two-way rotation permission state by driving control of a corresponding hydraulic actuator or electromagnetic actuator. Some known two-way clutches can further switch the one-way rotation permission state between a forward rotation permission state and a reverse rotation permission state. In this embodiment, switching between the one-way rotation permission state and the rotation inhibition state suffices, and using only the permission state in one rotation direction as the one-way rotation permission state suffices. However, a two-way clutch capable of selecting another state such as the two-way rotation permission state may be employed.

The connection relationship between the components will be described next with reference to FIG. 1. The sun gear S3 of the planetary gear mechanism P3 is connected to the input shaft 10. The ring gear R3 is connected to the sun gear S2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 11. Hence, the planetary gear mechanism P2 is a planetary gear mechanism that transmits an input rotation to the output shaft 13.

The clutch C1 connects the input shaft 10 to the carrier Cr1 of the planetary gear mechanism P1 and the carrier Cr2 connected to the carrier Cr1 in the engaging state, and disconnects them in the release state. Note that the release state will sometimes be referred to as a disengaging state. The clutch C2 connects the ring gear R3 of the planetary gear mechanism P3 to the sun gear S4 of the planetary gear mechanism P4 in the engaging state, and disconnects them in the release state. The clutch C3 connects the input shaft 10 to the ring gear R4 of the planetary gear mechanism P4 in the engaging state, and disconnects them in the release state.

The brake B1 connects the casing 12 to the sun gear S1 of the planetary gear mechanism P1 in the engaging state, and disconnects them in the release state. The brake B2 connects the casing 12 to the sun gear S4 of the planetary gear mechanism P4 in the engaging state, and disconnects them in the release state. The brake B3 connects the casing 12 to the ring gear R4 of the planetary gear mechanism P4 in the engaging state, and disconnects them in the release state.

As already described, the engaging mechanism F1 restricts the rotation of the carrier Cr2 of the planetary gear mechanism P2 (and the carrier Cr1 connected to the carrier Cr2) only in one direction in the one-way rotation permission state, and fixes the carrier Cr2 of the planetary gear mechanism P2 (and the carrier Cr1 connected to the carrier Cr2) to the casing 12 in the rotation inhibition state.

FIG. 2A is an engagement table (fastening table) showing the engaging combination of the engaging mechanisms provided in the automatic transmission 1. FIG. 2B shows the gear ratios of the planetary gear mechanisms provided in the automatic transmission 1. FIG. 3 is a velocity diagram of the automatic transmission 1. "Gear ratio" in FIG. 2A indicates the gear ratio between the input shaft 10 and the output member 11.

In this embodiment, 10 forward ranges (1st to 10th) and one reverse range (RVS) can be established. "P/N" represents non-running ranges; "P", a parking range; and "N", a neutral range. "RPM" represents an engaging combination in RVS preparation processing (to be described later). In this processing, the engaging mechanism F1 is switched from the one-way rotation permission state to the rotation inhibition state.

In the example of the engaging table shown in FIG. 2A, "○" indicates the engaging state, and no mark indicates the release state. Note that there are included engaging mechanisms that are set in the engaging state for smooth change to adjacent gear ranges, although the engagement is not essential to establish the gear ranges. For example, in the first range (1st), engagement of the brake B2 is not essential. However, when changing to the reverse range (RVS) or second range (2nd), the brake B2 is set in the engaging state for the purpose of decreasing the engaging mechanisms to switch the engaging state. Similarly, in the fifth range (5th), engagement of the clutch C3 is not essential. However, when changing to the fourth range (4th) or sixth range (6th), the clutch C3 is set in the engaging state for the purpose of decreasing the engaging mechanisms to switch the engaging state.

As for the engaging mechanism F1, "○" indicates the rotation inhibition state, and "Δ" indicates the one-way rotation permission state. In the first range (1st), the engaging mechanism F1 can be set in either the rotation inhibition state or the one-way rotation permission state. In the rotation inhibition state, the engine brake is enabled. In the first range, the engaging mechanism F1 is set in the one-way rotation permission state. The engine brake is switched between the enabled state and a disabled state by engaging or releasing the brake B3. In FIG. 2A, "○" of the brake B3 in the first range (1st) indicates this.

An algorithm to determine which state is set for the engaging mechanism F1 in the first range (1st) can appropriately be designed. In this embodiment, the state before a change to the first range (1st) is inherited. For example, when changed from the reverse range (RVS) to the first range (1st), the engaging mechanism F1 remains in the rotation inhibition state in the first range (1st). However, if, for example, the vehicle speed exceeds a predetermined speed, the engaging mechanism F1 is switched to the one-way rotation permission state. Similarly, when changed from other forward ranges (2nd to 10th) to the first range (1st), the engaging mechanism F1 remains in the one-way rotation permission state in the first range (1st).

In the non-running ranges (P/N) as well, the state of the engaging mechanism F1 can be either the rotation inhibition state or the one-way rotation permission state. In this embodiment, the state before a change to the non-running ranges (P/N) is inherited, as in the first range (1st). In the second range (2nd) to the 10th range (10th), the engaging mechanism F1 is set in the one-way rotation permission state, but slips because of the structure of the automatic transmission 1. For this reason, the state of the engaging mechanism F1 is indicated by "(Δ)".

Figure 3:
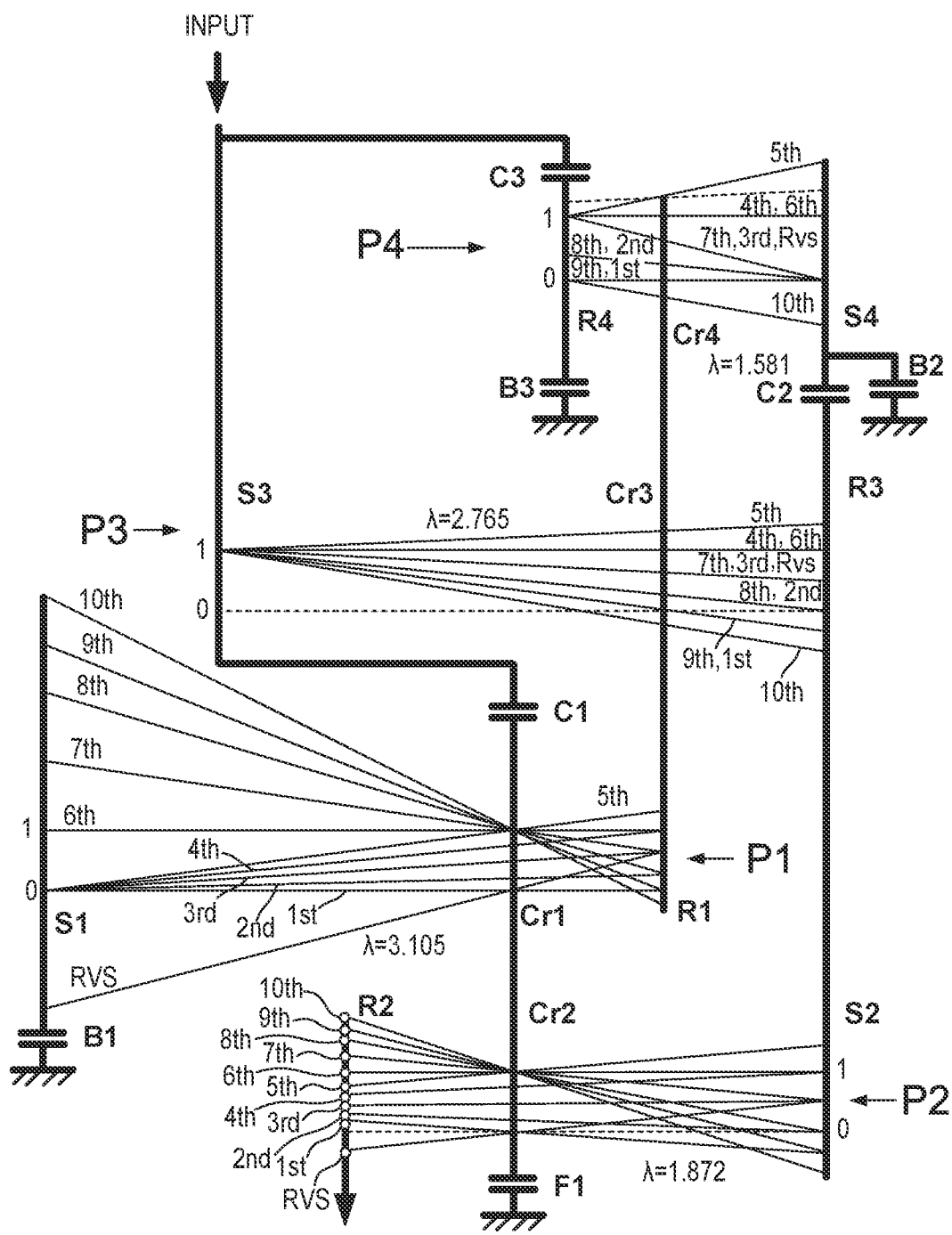
FIG. 3 is a velocity diagram of the automatic transmission shown in FIG. 1.

The velocity diagram of FIG. 3 shows the rotation speed ratio of each element to the input to the input shaft 10 in each gear range. The ordinate represents the speed ratio. "1" indicates the same rotation speed as the input shaft 10, and "0" indicates a stop state. The abscissa is based on the gear ratio between the rotational elements of the planetary gear mechanisms P1 to P4. λ is the gear ratio between a carrier Cr and a sun gear S. Note that in FIG. 3, elements corresponding to the output shaft 13 are not illustrated.

<Control Apparatus>

Figure 4A:
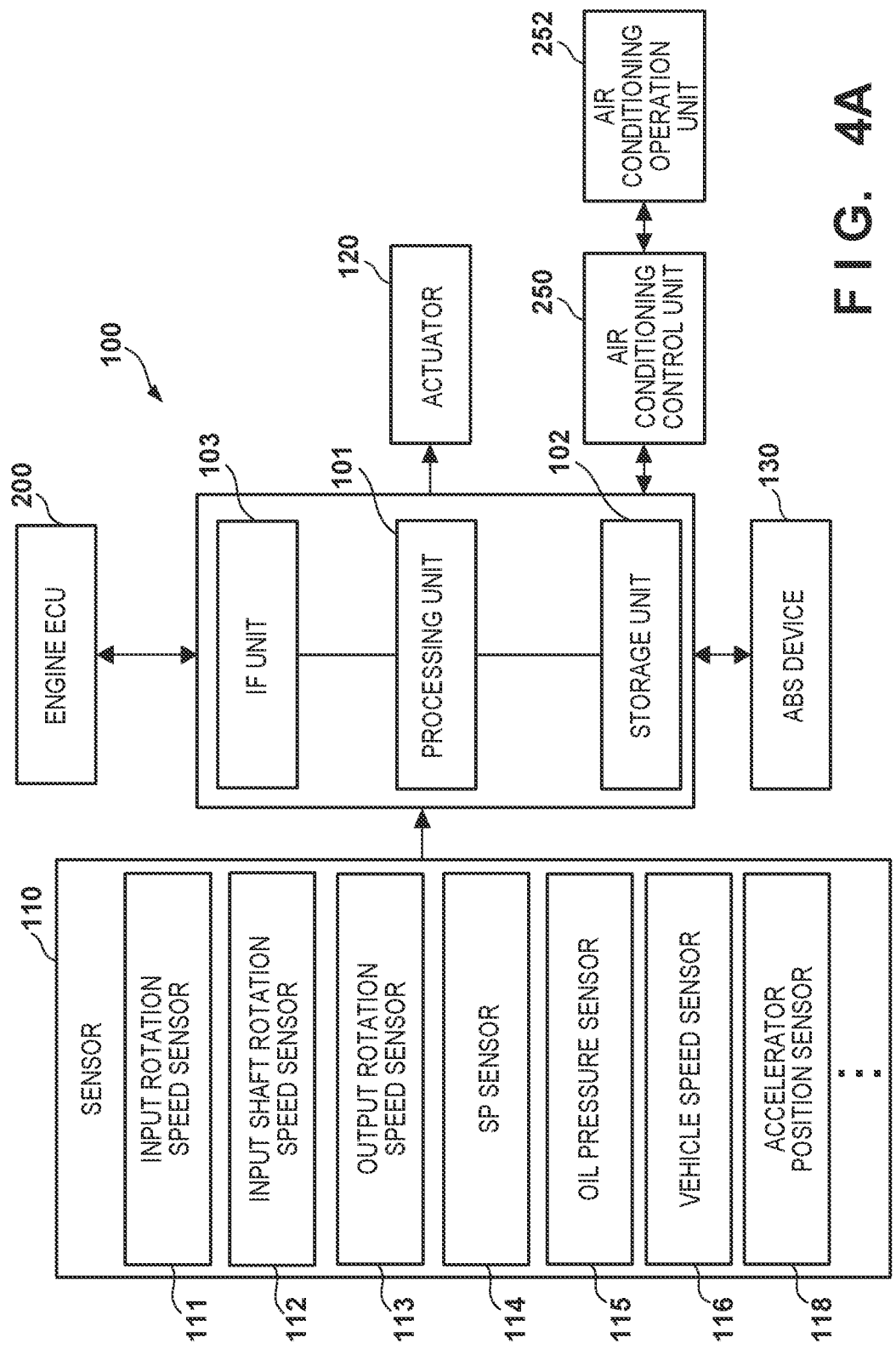
FIG. 4A is a block diagram showing an example of a control apparatus for the automatic transmission shown in FIG. 1.
Figure 4B:
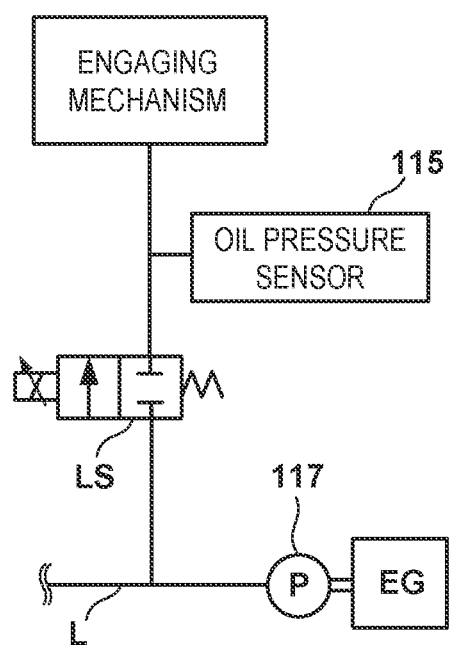
FIG. 4B is a view showing an example of the arrangement of an oil pressure sensor.

FIGS. 4A and 4B are block diagrams of a control apparatus 100 of the automatic transmission 1. The control apparatus 100 of the automatic transmission 1 is implemented by an electronic control unit (ECU) that controls at least the entire automatic transmission. The control apparatus 100 can control the automatic transmission 1 including a lock-up clutch LC and the torque converter TC. The control apparatus 100 can control not only the automatic transmission 1 but also the internal combustion engine EG. In this embodiment, an engine ECU 200 provided independently of the control apparatus 100 is configured to control the internal combustion engine EG. The control apparatus 100 can receive various kinds of information of the internal combustion engine EG and the vehicle from the engine ECU 200. The control apparatus 100 can also transmit the information of the automatic transmission 1 to the engine ECU 200.

The rotation output of the internal combustion engine EG is output to an engine output shaft 2. The rotation of the engine output shaft 2 is transmitted to the input shaft 10 of the automatic transmission 1 via the torque converter TC. The torque converter TC transmits the rotation torque of the engine output shaft 2 to the input shaft 10 of the automatic transmission 1 via a fluid (hydraulic oil).

The lock-up clutch LC performs lock-up control to connect a pump impeller 33 and a turbine wheel 32 by oil pressure control based on an instruction from the control apparatus 100. In the open state of the lock-up clutch LC, that is, in a state in which the pump impeller 33 and the turbine wheel 32 are not connected, the relative rotation of the pump impeller 33 and the turbine wheel 32 is permitted. In this state, when the rotation torque of the engine output shaft 2 is transmitted to the pump impeller 33, the hydraulic oil filling the torque converter TC circulates from the pump impeller 33 to the turbine wheel 32 along with the rotation of the pump impeller 33. Accordingly, the rotation torque of the pump impeller 33 is transmitted to the turbine wheel 32 to drive the input shaft 10. On the other hand, in the engaging state of the lock-up clutch, the relative rotation of the pump impeller 33 and the turbine wheel 32 is restricted, and the rotation torque of the engine output shaft 2 is directly transmitted to the input shaft 10 of the automatic transmission 1.

The engine ECU 200 controls the internal combustion engine EG to execute fuel cut to cut off fuel supply to the internal combustion engine EG based on the establishment of a predetermined condition during deceleration of the vehicle. The predetermined condition includes, for example, the deceleration state of the vehicle.

The control apparatus 100 can control the lock-up clutch LC provided in the torque converter TC in accordance with the driving state of the vehicle. For example, in the fuel cut state in which the fuel supply to the internal combustion engine EG is cut off, the control apparatus 100 can control to fasten the lock-up clutch LC. Even if the fuel cut state is not set under the predetermined condition, the control apparatus 100 can control to engage the lock-up clutch LC.

The control apparatus 100 includes a processing unit 101 such as a CPU, a storage unit 102 such as a RAM and ROM, and an IF unit 103 that functions as a connecting unit configured to perform communication between an external device or engine ECU and the processing unit 101. The IF unit 103 is formed from, for example, a communication interface or an input/output interface.

The processing unit 101 executes a program stored in the storage unit 102 and controls various kinds of actuators 120 based on the detection results of various kinds of sensors 110.

The various kinds of sensors 110 include various kinds of sensors provided in the automatic transmission 1. FIG. 4A illustrates the following sensors. An input rotation speed sensor 111 detects a rotation speed input from the internal combustion engine EG to the torque converter TC, that is, the rotation speed of the output shaft of the internal combustion engine EG. An input shaft rotation speed sensor 112 is a sensor that detects the rotation speed of the input shaft 10. The slip ratio: ETR of the torque converter TC is calculated by $$ETR\ (\%) = (\text{rotation speed detected by input shaft rotation speed sensor 112})/(\text{rotation speed detected by input rotation speed sensor 111}) \times 100$$

An output rotation speed sensor 113 is a sensor that detects the rotation speed of the output shaft 13.

An SP sensor (shift position sensor) 114 is a sensor that detects a shift position selected by the driver. In this embodiment, four types of shift positions, that is, P range (parking range), D range (forward range), N range (neutral range), and R range (reverse range) are assumed. If the D range is selected, the processing unit 101 can select one of the first range (1st) to the 10th range (10th) in accordance with a gear change map stored in the storage unit 102 and change the gear. If the R range is selected, the processing unit 101 selects the reverse range.

An oil pressure sensor 115 includes a sensor that detects the oil pressure of hydraulic oil in each of the engaging mechanisms C1 to C3 and B1 to B3. A vehicle speed sensor 116 detects the running speed of the vehicle on which the automatic transmission 1 is mounted.

The various kinds of actuators 120 include various kinds of actuators provided in the automatic transmission 1. For example, the actuators 120 include an electromagnetic actuator such as an electromagnetic solenoid that switches the operation state of each of the engaging mechanisms C1 to C3, B1 to B3, and F1. The processing unit 101 thus controls the various kinds of actuators 120.

FIG. 4B shows an example of the arrangement of the oil pressure sensor 115. The oil pressure sensor 115 can be provided for, for example, each of the engaging mechanisms C1 to C3 and B1 to B3. The oil pressure of hydraulic oil in each engaging mechanism can thus be detected. Note that the oil pressure sensor 115 need not always be provided for each engaging mechanism.

A solenoid valve LS for supplying hydraulic oil is assigned to each engaging mechanism. A hydraulic oil supply line L is opened or closed by the solenoid valve LS, thereby switching the engaging and release states of each engaging mechanism. The oil pressure sensor 115 is provided so as to receive the hydraulic oil supplied from the solenoid valve LS to the engaging mechanism. The detection result of the oil pressure sensor 115 represents the oil pressure of the hydraulic oil supplied to the engaging mechanism. An oil pump 117 driven by the internal combustion engine EG forces the hydraulic oil into the supply line L.

<Switching Control of Engaging Mechanism F1>

In this embodiment, the engaging mechanism F1 is in the rotation inhibition state in the reverse range. When switching from the forward range or non-running range to the reverse range, the engaging mechanism F1 is sometimes switched from the one-way rotation permission state to the rotation inhibition state. At this time, to reduce unusual noise or vibration, the difference between the rotation speed of the engaging mechanism F1 on the side of the casing 12 and that on the side of the carrier Cr2 is preferably 0. In other words, the rotation speed of the carrier Cr2 is preferably 0.

To do this, a combination of engaging mechanisms that changes the rotation speed of the carrier Cr2 to 0 intervenes. In this embodiment, there is no sensor for directly measuring the rotation speed of the carrier Cr2. For this reason, the carrier Cr2 and the input shaft 10 are connected, and it is confirmed from the detection result of the input shaft rotation speed sensor 112 or the like that the rotation speed of the carrier Cr2 is 0. After that, the engaging mechanism F1 is switched to the rotation inhibition state.

FIG. 5 shows the engaging combination of engaging mechanisms when switching the gear range from the first forward range to the reverse range. When the gear range is the first forward range, the brakes B1 and B2 are in the engaging state, as shown in FIG. 2A. The engaging mechanism F1 is assumed to be in the one-way rotation permission state. First, as indicated by step 1 in FIG. 5, the brakes B1 and B2 are controlled to the release state. When release of the brakes B1 and B2 is completed, the process advances to step 2. In step 2, the clutches C1 and C3 and the brake B3 engage. The ring gear R2 and the output shaft 13 are rotatable, and the driving wheels can freely rotate. It is therefore possible to avoid an unexpected behavior of the vehicle.

As is apparent from the velocity diagram of FIG. 3, when the clutch C3 and the brake B3 engage, the input shaft 10 is fixed to the casing 12. When the clutch C1 engages, the carrier Cr2 is connected to the input shaft 10.

Note that in this embodiment, step 2 is performed next to step 1. However, step 1 and step 2 may be performed simultaneously. More specifically, while performing control to set the brakes B1 and B2 in the release state, control to engage the clutches C1 and C3 and the brake B3 may be performed. This can improve responsiveness when switching the gear range to the reverse range.

If predetermined conditions are met, the process advances to step 3. The predetermined conditions are conditions to confirm that the rotation speed of the carrier Cr2 is 0. Basically, the conditions are completion of engagement of the clutch C1 and detection result of input rotation speed sensor 111<predetermined value (for example, a value that can be regarded as 0). As for the completion of engagement of the clutch C1, for example, when the detection result of the oil pressure sensor 115 of the clutch C1 indicates a predetermined oil pressure or when the control amount of the solenoid valve LS for the clutch C1 reaches a predetermined value, it can be determined that engagement is completed. The same determination method can be employed even for completion of engagement of other engaging mechanisms.

In step 3, the engaging mechanism F1 is switched from the one-way rotation permission state to the rotation inhibition state. Since the difference between the rotation speed of the engaging mechanism F1 on the side of the casing 12 and that on the side of the carrier Cr2 is 0, occurrence of unusual noise or vibration can be avoided. When switching of the engaging mechanism F1 is completed, the process advances to step 4. In step 4, the clutch C1 and the brake B3 are released, and the brake B2 engages. The combination for the reverse range thus holds (FIG. 2A).

In some cases, the processing of steps 2 and 3 is called RVS preparation processing, and the processing of step 4 is called RVS in-gear processing. In terms of control, when step 1 is completed, an RVS preparation mode is set. When the RVS preparation mode is set, RVS preparation processing is performed. In addition, when step 3 is completed, an RVS in-gear mode is set as the control state of the gear range. When the RVS in-gear mode is set, RVS in-gear processing is performed. Such mode setting is managed by, for example, providing a mode information storage area in the storage unit 102. An example of processing executed by the processing unit 101 concerning details of control shown in FIG. 5 will be described later with reference to FIGS. 6A and 6B.

Figure 6A:
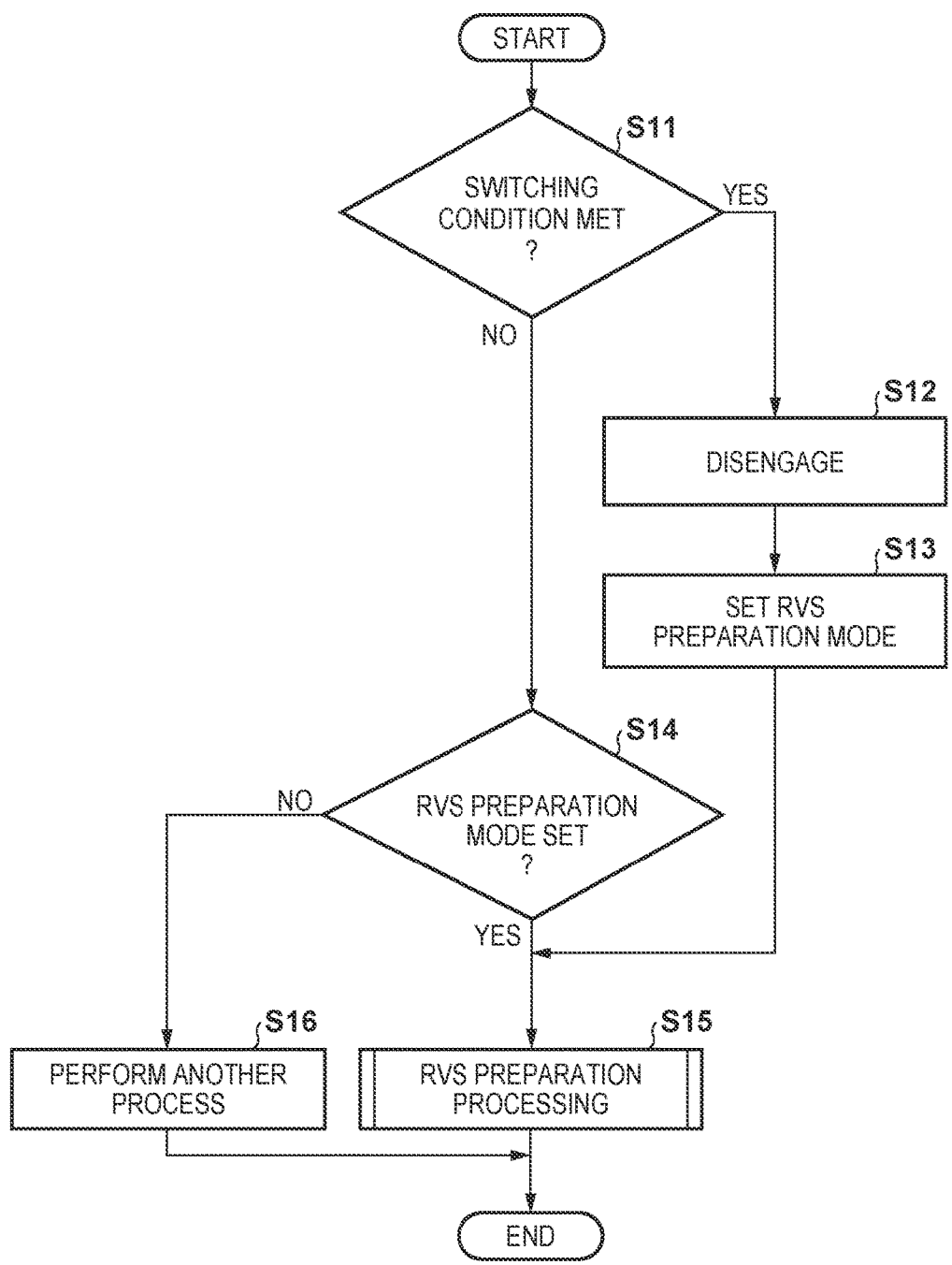
FIGS. 6A and 6B are flowcharts showing an example of processing of the control apparatus shown in FIGS. 4A and 4B.

FIG. 6A will be referred to. In step S11, it is determined whether a condition to switch the engaging mechanism F1 from the one-way rotation permission state to the rotation inhibition state is met. In this embodiment, if the engaging mechanism F1 is in the one-way rotation permission state, and the SP sensor 114 detects that the driver has switched the shift range from another range to the reverse range, it is determined that the condition is met. If YES in step S11, the process advances to step S12. Otherwise, the process advances to step S14.

In step S12, the engaging mechanisms (for example, the brakes B1 and B2) in the engaging state are released, as described concerning step 1 shown in FIG. 5. In step S13, the RVS preparation mode is set as the control mode. After that, the process advances to step S15.

In step S14, it is determined whether the RVS preparation mode is set. If YES in step S14, the process advances to step S15. Otherwise, the process advances to step S16. In step S15, RVS preparation processing is performed. Details will be described later. In step S16, another process is performed, and the processing of one unit ends.

Figure 6B:
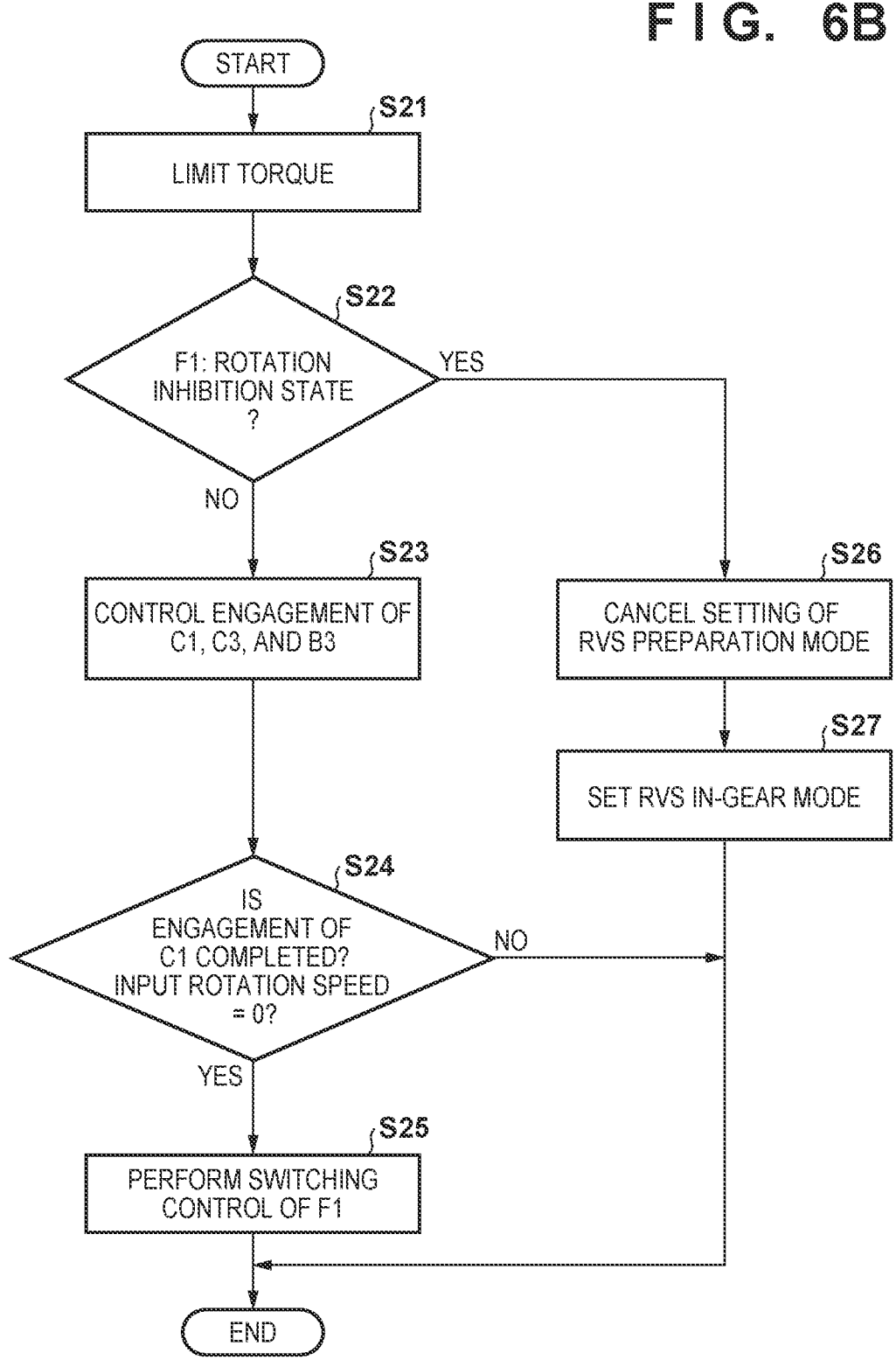

FIG. 6B will be referred to. FIG. 6B is a flowchart showing RVS preparation processing of step S15. In step S21, torque limitation of the driving source of the automatic transmission 1 is executed. For example, the output of the internal combustion engine EG is reduced within the range in which the necessary oil pressures of the engaging mechanisms and the like are ensured.

In step S22, it is determined whether switching of the engaging mechanism F1 to the rotation inhibition state is completed. If YES in step S22, the process advances to step S26. Otherwise, the process advances to step S23.

In step S23, control to engage the clutches C1 and C3 and the brake B3 starts, as described concerning step 2 shown in FIG. 5. The clutches C1 and C3 and the brake B3 can be engaged by increasing the control amounts to the solenoid valves LS of these engaging mechanisms stepwise. When the process of step S23 is repeated a plurality of times, the engagement is completed.

In step S24, it is determined whether engagement of the clutch C1 is completed, and the rotation speed of the input shaft 10 is 0, as described concerning step 2 shown in FIG. 5. If all the conditions are met, the process advances to step S25. If not all the conditions are met, the processing of one unit ends.

In step S25, the state of the engaging mechanism F1 is switched to the rotation inhibition state, as described concerning step 3 shown in FIG. 5. Since the switching is done in a state in which the difference between the rotation speed of the engaging mechanism F1 on the side of the casing 12 and that on the side of the carrier Cr2 is 0, it is possible to prevent occurrence of unusual noise or vibration and avoid breakage of the engaging mechanism F1.

In step S26, setting of the RVS preparation mode is canceled. In step S27, the RVS in-gear mode is set. With this setting, processing of releasing the clutch C1 and the brake B3 and engaging the brake B2 is performed, as described concerning step 4 shown in FIG. 5, in another routine (for example, step S16 in FIG. 6A). The processing thus ends.

<Control of Lock-Up Clutch LC>

Figure 7:
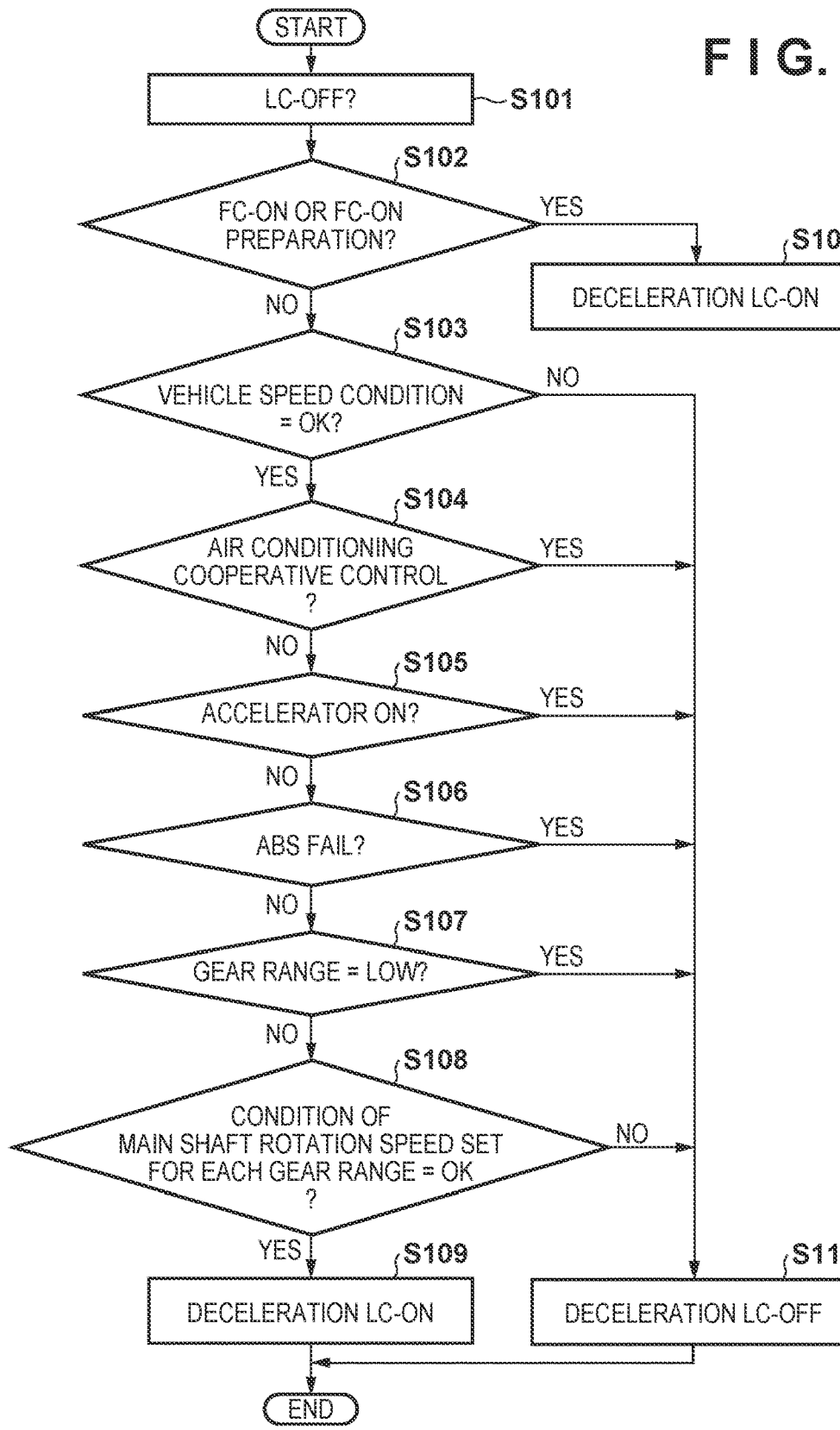
FIG. 7 is a flowchart for explaining the procedure of lock-up clutch control.

Control of the lock-up clutch LC according to this embodiment will be described. FIG. 7 is a flowchart for exemplarily explaining the procedure of control of the lock-up clutch LC according to this embodiment.

In step S101, to prevent hunting of engagement (LC-ON)/disengagement (LC-OFF) of the lock-up clutch LC, the control apparatus 100 does not repetitively execute control of the lock-up clutch LC according to this embodiment in a predetermined time once the lock-up clutch LC is disengaged.

In step S102, the control apparatus 100 obtains a vehicle speed change ratio in a predetermined time based on, for example, vehicle speed information detected by the vehicle speed sensor 116, and determines whether the vehicle is in the deceleration state. Note that determining whether the vehicle is in the deceleration state is not limited to this example. For example, the control apparatus 100 may acquire the data of a throttle valve opening detected by an accelerator position sensor 118 and determine whether the vehicle is in a deceleration state with the throttle valve fully closed (AP_OFF). The vehicle speed sensor 116 and the accelerator position sensor 118 function as detection units configured to detect the running state of the vehicle. If the vehicle is in the deceleration state, the control apparatus 100 further determines, based on the signal from the engine ECU 200, whether fuel cut (FC) is currently being executed. If the vehicle is in the deceleration state, and fuel cut (FC) is being executed (FC-ON: YES in step S102), the control apparatus 100 executes lock-up clutch control (deceleration LC-ON) to set the lock-up clutch LC in the engaging state in the deceleration state (step S109). The control apparatus 100 functions as a fuel cut determination unit configured to determine, based on a control signal to control the engine, whether fuel cut to cut off fuel supply to the engine is being executed in a case in which the running state of the vehicle is the deceleration state based on detection by the detection unit.

In a case in which even if the fuel cut control condition is met, fuel cut control is not performed immediately but performed after the elapse of a predetermined time from the time when the fuel cut control condition is met, the engine ECU 200 transmits a control signal representing a fuel cut delay to the control apparatus 100. Based on the presence/ absence of reception of the control signal from the engine ECU 200, the control apparatus 100 can determine whether the fuel cut delay is being performed. Even during the fuel cut delay (during preparation for FC-ON), the control apparatus 100 executes lock-up clutch control (deceleration LC-ON) to set the lock-up clutch LC in the engaging state (step S109). When the fuel cut (FC) execution state is set after the elapse of the delay time, the control apparatus 100 continues the lock-up clutch control (deceleration LC-ON) and maintains the engaging state (LC-ON state) of the lock-up clutch.

On the other hand, if the control apparatus 100 determines in step S102 that fuel cut (FC) is not being executed (NO in step S102), the process advances to step S103.

In step S103, the control apparatus 100 determines, based on the detection result of the vehicle speed sensor 116, whether a vehicle speed Nv of the vehicle is a predetermined vehicle speed (reference vehicle speed) or more. For example, if the control apparatus 100 determines that the vehicle speed Nv is less than the reference vehicle speed (the vehicle speed Nv does not exceed the reference vehicle speed) (NO in step S103), the control apparatus 100 controls the lock-up clutch LC to an open state (deceleration LC-OFF: step S110) and ends the determination processing. On the other hand, upon determining in step S103 that the vehicle speed Nv of the vehicle is the predetermined vehicle speed (reference vehicle speed) or more (YES in step S103), the process advances to step S104.

In step S104, the control apparatus 100 determines whether air conditioning cooperative control is being executed. If an air conditioning operation request (cooling request or heating request) is input from an air conditioning operation unit 252 to the control apparatus 100 via an air conditioning control unit 250, the control apparatus 100 determines that air conditioning cooperative control is being executed, controls the lock-up clutch LC to the open state (deceleration LC-OFF: step S110), and ends the determination processing. On the other hand, upon determining in step S104 that air conditioning cooperative control is not being executed (NO in step S104), the process advances to step S105.

In step S105, the control apparatus 100 acquires the data of the throttle valve opening detected by the accelerator position sensor 118 and determines whether a state in which the accelerator pedal is depressed, that is, an accelerator ON state is set. If the accelerator ON state is set (YES in step S105), the control apparatus 100 controls the lock-up clutch LC to the open state (deceleration LC-OFF: step S110) and ends the determination processing.

On the other hand, upon determining in step S105 that the accelerator ON state is not set (NO in step S105), in step S106, the control apparatus 100 determines, based on the presence/absence of an operation signal from an antilock brake device (ABS device) 130, whether the ABS device 130 is in a normally operating state or in a fail state. The control apparatus 100 functions as a state determination unit configured to determine, based on the operation signal from the ABS device 130, whether the ABS device 130 of the vehicle is in the normally operating state or in the fail state in which the ABS device 130 does not normally operate. If the ABS device 130 is normally operating, the ABS device 130 outputs the operation signal to the control apparatus 100. If the ABS device 130 malfunctions (fail state), the ABS device 130 does not output the operation signal to the control apparatus 100. Upon receiving the operation signal from the ABS device 130, the control apparatus 100 determines that the ABS device 130 is normally operating. If the operation signal is not received, the control apparatus 100 determines that the ABS device 130 is in the fail state in which the ABS device 130 is not normally operating. If the ABS device 130 is in the fail state (YES in step S106), the control apparatus 100 controls the lock-up clutch LC to the open state (deceleration LC-OFF: step S110) and ends the determination processing. If the ABS device 130 is in the fail state, to avoid panic engine stall caused by sudden braking, the control apparatus 100 does not perform lock-up clutch control (deceleration LC-ON) in deceleration to set the lock-up clutch LC in the engaging state in the deceleration state. By this control, occurrence of panic engine stall can be avoided.

On the other hand, upon determining in step S106 that the ABS device 130 is not in the fail state, that is, the ABS device 130 is normally operating (NO in step S106), the process advances to step S107.

In step S107, the control apparatus 100 determines which gear range is set in the automatic transmission 1. For example, in a case in which the D range is selected by the SP sensor 114, the processing unit 101 of the control apparatus 100 can select one of the first range (1st) to 10th range (10th) in accordance with the gear change map stored in the storage unit 102 and change the gear. If the gear range set here is a predetermined low-speed range (for example, the first range (1st)) (YES in step S107), the control apparatus 100 controls the lock-up clutch LC to the open state (deceleration LC-OFF: step S110) and ends the determination processing. In the engaging mechanism combination that forms the first range (1st), the engaging mechanism F1 is in the one-way rotation permission state. Hence, in this case, the control apparatus 100 controls the lock-up clutch LC to the open state.

Upon determining in step S107 that the set gear range is not the first range (1st) (NO in step S107), that is, the set gear range is one of the second range (2nd) to the 10th range (10th), the process advances to step S108.

In step S108, the control apparatus 100 functions as a rotation speed determination unit configured to determine whether the rotation speed of the input shaft detected by the input shaft rotation speed sensor 112 (rotation speed detection unit) is equal to or higher than a reference rotation speed corresponding to the gear range of the automatic transmission 1. The control apparatus 100 refers to the condition of the rotation speed of the main shaft (input shaft 10) of the automatic transmission 1 set for each gear range.

FIG. 8 is a view showing a control map 121. For example, the storage unit 102 stores the control map 121 that associates each gear range with the reference rotation speed of the main shaft (input shaft 10) of the automatic transmission 1 in each gear range. The control apparatus 100 can refer to the control map 121 in the storage unit 102 and acquire, from the control map 121, the reference rotation speed of the main shaft (input shaft 10) associated with the gear range selected in the running state of the vehicle. For example, when the vehicle is running in the fifth range (5th), the control apparatus 100 refers to the control map 121 and acquires a reference rotation speed N5. Similarly, when the vehicle is running in the sixth range (6th), the control apparatus 100 refers to the control map 121 and acquires a reference rotation speed N6.

The driving force input from the torque converter TC to the input shaft 10 is transmitted to the output shaft 13 via a driving force transmission path formed for each gear range of the automatic transmission 1. In the driving force transmission path formed for each gear range, the inertia of the automatic transmission 1 can change in accordance with the operation states of the engaging mechanisms C1 to C3, B1 to B3, and F1. As the inertia becomes large, a damping force capable of damping a vibration sound and vibration from the internal combustion engine EG increases, and panic engine stall toughness also increases. When the plurality of engaging mechanisms (for example, C1 to C3, B1 to B3, and F1) of the automatic transmission 1 are switched to switch the driving force transmission path in the plurality of planetary gear mechanisms (for example, P1 to P4) and establish the plurality of gear ranges, the inertia changes in each gear range, and the panic engine stall toughness also changes in each gear range. For this reason, considering the change in the inertia (the change in the panic engine stall toughness) in the driving force transmission path of each gear range in advance, a reference rotation speed to obtain a predetermined panic engine stall toughness is set in the control map 121. The reference rotation speed of the input shaft in the control map 121 is a rotation speed set based on the change in the inertia (the change in the panic engine stall toughness) in the driving force transmission path corresponding to each gear range of the automatic transmission 1.

In addition, the control apparatus 100 acquires the current rotation speed of the input shaft 10 based on the detection result of the input shaft rotation speed sensor 112. Based on the comparison between the rotation speed of the input shaft 10 acquired from the input shaft rotation speed sensor 112 and the reference rotation speed acquired from the control map 121 in the storage unit 102, the control apparatus 100 determines whether the rotation speed of the input shaft is equal to or higher than the reference rotation speed. If the rotation speed of the input shaft 10 is lower than the reference rotation speed (NO in step S108), the control apparatus 100 controls the lock-up clutch LC to the open state (deceleration LC-OFF: step S110) and ends the determination processing.

On the other hand, upon determining in step S108 that the rotation speed of the input shaft 10 is equal to or higher than the reference rotation speed (YES in step S108), the control apparatus 100 executes lock-up clutch control (deceleration LC-ON) to set the lock-up clutch LC in the engaging state in the deceleration state (step S109). When the running state of the vehicle is the deceleration state, fuel cut is not being executed, the ABS device normally operates, and the rotation speed of the input shaft is equal to or higher than the reference rotation speed, the control apparatus 100 (operation control unit) controls the lock-up clutch to the engaging state.

Note that the flowchart described with reference to FIG. 7 exemplarily shows the procedure of control of the lock-up clutch LC, and the execution order of the steps is not limited to the step order shown in FIG. 7. For example, steps S106 and S108 can be executed after the process of step S102. If engaging mechanisms that do not set the engaging mechanism F1 in the one-way rotation permission state are used in the combination of engaging mechanisms to form the first range (1st) in the automatic transmission 1, step S108 can be executed after execution of step S106 without executing step S107. In this case, pieces of information of reference rotation speeds from the first range (1st) to the 10th range (10th) are stored as the reference rotation speeds corresponding to the gear ranges stored in the control map 121.

<Summary of Embodiment>

Arrangement 1. A control apparatus (for example, 100) according to the embodiment is a control apparatus for an automatic transmission including a torque converter (for example, TC) with a lock-up clutch (for example, LC) capable of connecting an output shaft (for example, 2) of an engine (for example, EG) and an input shaft (for example, 10) of the automatic transmission (for example, 1), comprising:

a fuel cut determination unit (for example, S102, 100) configured to determine, based on a control signal to control the engine, whether fuel cut to cut off fuel supply to the engine is being executed in a case in which a running state of a vehicle is a deceleration state based on detection by a detection unit (for example, 116, 118) configured to detect the running state of the vehicle;

a state determination unit (for example, S106, 100) configured to determine, based on an operation signal from an ABS device, whether the ABS device of the vehicle is in a normally operating state or in a fail state in which the ABS device does not normally operate;

a rotation speed determination unit (for example, S108, 100) configured to determine whether a rotation speed of the input shaft detected by a rotation speed detection unit (for example, 112) is not less than a reference rotation speed corresponding to a gear range of the automatic transmission; and an operation control unit (for example, S109, 100) configured to control engagement of the lock-up clutch based on an operation state of the ABS device and a result of comparison between the rotation speed of the input shaft and the reference rotation speed in a state in which the running state of the vehicle is the deceleration state, and the fuel cut is not being executed.

Arrangement 2. The operation control unit controls the engagement of the lock-up clutch when the ABS device is in the normally operating state (for example, NO in S106 of FIG. 7), and the rotation speed of the input shaft is not less than the reference rotation speed (for example, YES in S108 of FIG. 7) (for example, S109 of FIG. 7).

According to the embodiment of arrangements 1 and 2, it is possible to control the engagement of the lock-up clutch based on the operation state of the ABS device and the result of comparison between the rotation speed of the input shaft and the reference rotation speed even in a range where fuel cut is not performed in a case in which the running state of the vehicle is the deceleration state.

When the engagement of the lock-up clutch is controlled in this way, fuel consumption can be improved. If the accelerator pedal is ON in the disengaging state of the lock-up clutch LC, the engine speed may abruptly increase. However, the lock-up clutch is controlled to the engaging state in a case in which the running state of the vehicle is the deceleration state, and the above condition is met. This makes it possible to provide a vehicle that has excellent marketability and can implement smoother acceleration without causing an abrupt increase in the engine speed even if the accelerator pedal is ON.

Arrangement 3. The control apparatus further comprises a storage unit (for example, 102) configured to store a control map (for example, 121) that associates each gear range of the automatic transmission with a reference rotation speed of the input shaft in each gear range, the rotation speed determination unit (for example, S108, 100)

acquires, from the control map, the reference rotation speed of the input shaft associated with the gear range selected in the running state of the vehicle, and performs the determination based on comparison between the detected rotation speed of the input shaft and the reference rotation speed of the input shaft acquired from the control map. That is, the rotation speed determination unit determines whether the rotation speed of the input shaft detected by the rotation speed detection unit is equal to or higher than the reference rotation speed corresponding to the gear range of the automatic transmission.

Arrangement 4. The reference rotation speed (for example, N2 to N10 of 121) of the input shaft is a rotation speed set based on a change in an inertia in a driving force transmission path corresponding to each gear range (for example, from second range (2nd) to 10th range (10th)) of the automatic transmission.

According to the embodiment of arrangements 3 and 4, the reference rotation speed serving as the determination criterion of the rotation of the input shaft (main shaft) of the automatic transmission is set for each gear range. This makes it possible to perform a comparison test between the rotation speed of the input shaft and the reference rotation speed in accordance with the selected gear range of the automatic transmission.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus for an automatic transmission including a torque converter with a lock-up clutch capable of connecting an output shaft of an engine and an input shaft of the automatic transmission, comprising:
   a fuel cut determination unit configured to determine, based on a control signal to control the engine, whether fuel cut to cut off fuel supply to the engine is being executed in a case in which a running state of a vehicle is a deceleration state based on detection by a detection unit configured to detect the running state of the vehicle;
   a state determination unit configured to determine, based on an operation signal from an ABS device, whether the ABS device of the vehicle is in a normally operating state or in a fail state in which the ABS device does not normally operate;
   a rotation speed determination unit configured to determine whether a rotation speed of the input shaft detected by a rotation speed detection unit is not less than a reference rotation speed corresponding to a gear range of the automatic transmission; and
   an operation control unit configured to control engagement of the lock-up clutch based on an operation state of the ABS device and a result of comparison between the rotation speed of the input shaft and the reference rotation speed in a state in which the running state of the vehicle is the deceleration state, and the fuel cut is not being executed.

2. The apparatus according to claim 1, wherein the operation control unit controls the engagement of the lock-up clutch when the ABS device is in the normally operating state, and the rotation speed of the input shaft is not less than the reference rotation speed.

3. The apparatus according to claim 1, further comprising a storage unit configured to store a control map that associates each gear range of the automatic transmission with a reference rotation speed of the input shaft in each gear range, wherein the rotation speed determination unit
   acquires, from the control map, the reference rotation speed of the input shaft associated with the gear range selected in the running state of the vehicle, and
   performs the determination based on comparison between the detected rotation speed of the input shaft and the reference rotation speed of the input shaft acquired from the control map.

4. The apparatus according to claim 1, wherein the reference rotation speed of the input shaft is a rotation speed set based on a change in an inertia in a driving force transmission path corresponding to each gear range of the automatic transmission.

* * * * *